G. M. RICHMOND.
Machine for Preparing Feathers for Dusters.
No. 216,366. Patented June 10, 1879.
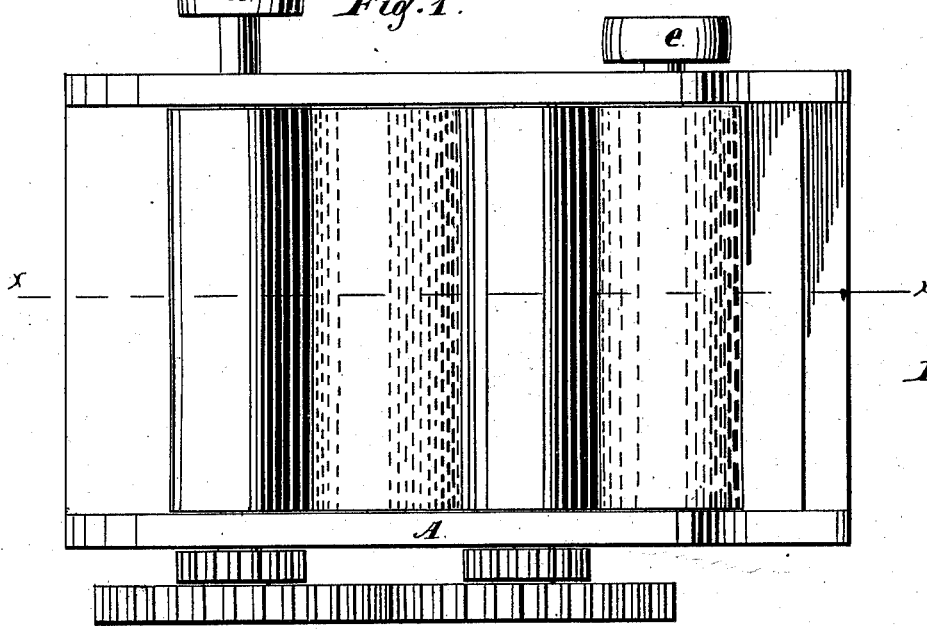
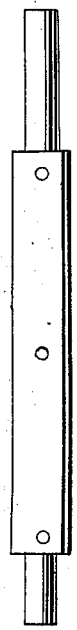
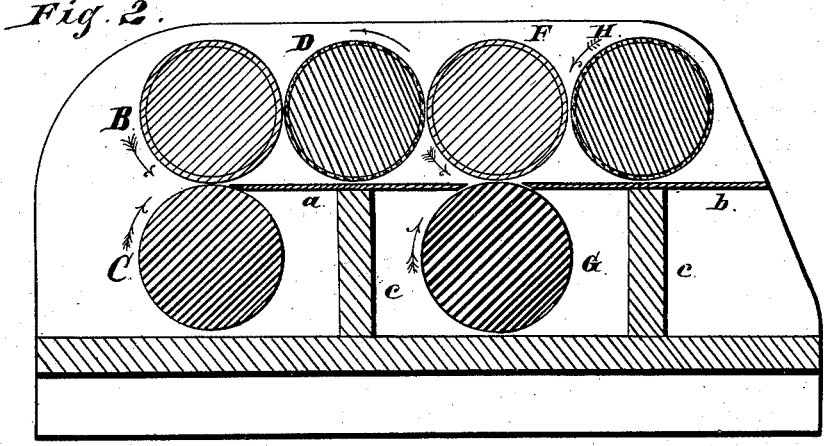
Witnesses:
Inventor:
Gilbert M. Richmond
By West & Bond Attys

UNITED STATES PATENT OFFICE.

GILBERT M. RICHMOND, OF CHICAGO, ILLINOIS, ASSIGNOR TO EMELINE C. WEBSTER AND WM. HUBBARD, OF SAME PLACE, AND AMOS F. HUBBARD, OF ASHTABULA, OHIO.

IMPROVEMENT IN MACHINES FOR PREPARING FEATHERS FOR DUSTERS.

Specification forming part of Letters Patent No. 216,366, dated June 10, 1879; application filed December 21, 1878.

*To all whom it may concern:*

Be it known that I, GILBERT M. RICHMOND, of Chicago, Cook county, State of Illinois, have invented a new and useful Improvement in Machines for Preparing Feathers for Dusters, of which the following is a full description, reference being had to the accompanying drawings, in which—

Figure 1 is a plan; Fig. 2, a vertical section taken at line *x* of Fig. 1. Figs. 3 and 4 show a series of knives that may be used instead of the coarse emery-roller.

This invention is an improvement in machinery for preparing feathers for dusters for which a patent has been heretofore granted to me. In that patent I made provision for cleaning the pith from the stems of feathers after the same had been split, cutting away the inside of the stem, which splitting required a separate operation.

The object of this invention is to construct a machine by the use of which the inside of the stem can be cut away and the pith removed at a single operation; and this I accomplish by the use of suitable cutting or rasping rollers, combined with feed-rollers and with one or more finer-faced rollers, for cleaning the inside of the stem after the greater part of the pith has been removed, as hereinafter more fully described.

In the drawings, A represents a suitable frame. B and C are feed-rollers. D is a roller covered with coarse emery. F G are two other feed-rollers, and H is another roller covered with fine emery or sand paper, or other similar suitable material. All these rollers are supported in suitable bearings. The rollers B and F are preferably covered with rubber; but any suitable feed-rollers may be used.

*a* is a table on which the feathers are carried from the feed-rollers B C, and, by their action, to and beneath the roller D, and *b* is a similar table under the roller H. These tables are supported in any suitable manner. As shown, they are on the supports *c*.

The rollers D and H should be run at a high speed—say about three thousand revolutions per minute—and may be run by belts on the pulleys *d e*. The feed-rollers should have about one hundred revolutions per minute, and may be run by means of suitable gear-wheels. The arrows indicate the direction in which the several rollers rotate.

In use, the feathers to be prepared for dusters are fed between the rollers B C, and by them will be carried along the table *a* to and under roller D, which will remove the inside of the stem and the greater portion of the pith, and the feathers will be carried along to the feed-rollers F G, and thence over the table *b* to and beneath the cleaning-roller H, which will take out any remaining pith.

I do not confine myself to the exact arrangement of rollers shown, as I find by trial that it is sometimes desirable to put the cleaning-roller H in the place of the feed-roller F, though usually the arrangement shown will result in efficient work.

The rollers D and H should be so inserted in the frame that they can be easily removed. F should be inserted in the same manner if it is to be interchanged with H.

When the rough surfaces of the rollers D and H become worn they can be replaced or new rollers can be used.

I find by actual use that a machine constructed as described will effectually remove the hard interior of the stem of the feather, and also the pith, by a single operation, saving considerable time and labor as compared with any other means now used for doing the same work. Heretofore the inside of the stem has been removed by one operation, and the remaining pith has then been removed by another operation.

The two rollers D H can be made vertically adjustable in the usual manner, and the upper feed-rollers can be made adjustable.

Instead of the emery-roller D, a series of knives might be used located on a revolving shaft, for the purpose of cutting away the inside of the stem and the greater part of the pith, the cleaning-roller H being used as before described. In Figs. 3 and 4 I have shown, on a reduced scale, such knives arranged on a shaft.

In practice I shall use rollers D H about three inches in diameter, made by covering a steel shaft with solid emery, such shaft being, say, about three-fourths of an inch in diameter. Such rollers will be durable, and will wear away very slowly. If the rollers are covered with a thin coating of emery, the same will have to be frequently replaced.

For ordinary uses the rollers may be about one foot long; but they may be longer or shorter. As shown, the rollers are all of the same diameter; but this is not essential.

Another cleaning-roller might be used in connection with the roller H and suitable feed-rollers.

What I claim as new, and desire to secure by Letters Patent, is as follows:

1. In a machine for preparing feathers for dusters, a roller, D, covered with coarse emery, or otherwise adapted to remove the interior of the stem of a feather and a greater part of the pith, in combination with the table a, cleaning-roller H, and suitable feed-rollers, substantially as and for the purposes specified.

2. In a machine for preparing feathers for dusters, a roller, D, covered with coarse emery, or otherwise adapted to remove the inside of the stem and the greater part of the pith of a feather, in combination with a cleaning-roller, H, suitable feed-rollers, and table a, substantially as and for the purposes set forth.

GILBERT M. RICHMOND.

Witnesses:
E. A. WEST,
O. W. BOND.